United States Patent

Tagge et al.

[11] Patent Number: 5,919,045
[45] Date of Patent: Jul. 6, 1999

[54] INTERACTIVE RACE CAR SIMULATOR SYSTEM

[75] Inventors: James E. Tagge, Lenox; Michael J. Tagge, Pittsfield; Thomas L. Rindge, Lenox, all of Mass.; Gary Hilchey, Bennington, Va.; Adrian Alcala, Great Barrington; Timothy J. Ambrosino, Pittsfield, both of Mass.

[73] Assignee: Mariah Vision³ Entertainment LLC, Pittsfield, Mass.

[21] Appl. No.: 08/751,647

[22] Filed: Nov. 18, 1996

[51] Int. Cl.⁶ .................................................. G09B 9/00
[52] U.S. Cl. ................................................ 434/62; 434/29
[58] Field of Search .................... 434/29, 60–71; 463/6, 7, 30, 35, 36, 39; 364/578

[56] References Cited

U.S. PATENT DOCUMENTS

| | | | |
|---|---|---|---|
| 5,015,189 | 5/1991 | Wenzinger | 434/69 |
| 5,299,810 | 4/1994 | Pierce et al. | 434/69 |
| 5,354,202 | 10/1994 | Moncrief et al. | 434/69 |
| 5,547,382 | 8/1996 | Yamasaki et al. | 434/69 |
| 5,618,179 | 4/1997 | Copperman et al. | 434/69 |
| 5,707,237 | 1/1998 | Takemoto et al. | 434/69 |

*Primary Examiner*—Glenn E. Richman
*Attorney, Agent, or Firm*—McCormick, Paulding & Huber

[57] ABSTRACT

An interactive, vehicle simulator system receives input signals indicative of actions of a user who is located in a driver module. The simulator system also displays images and moves the driver module in accordance with the input signals. The simulator system comprises an input device for generating the input signals, an image generator, an image presentation apparatus, a motion base, a motion base controller and a game controller.

The image generator receives signals indicative of a first set of processed, pre-recorded digital images, and generates signals indicative of a second set of digital images. The second set of digital images is indicative of a select number of the first set of processed, pre-recorded digital images as seen from a desired viewpoint which has a desired velocity. The image presentation apparatus receives the signals indicative of the second set of digital images and generates in dependence thereupon the second set of digital images, which it presents to the user.

The motion base is connected to the driver module and thus moves the driver module along at least one axis in accordance with motion base control signals. The motion base controller is in signal communication with the motion base and generates the motion base control signals. The game controller is in signal communication with the input device, the motion base controller and the image generator, and generates signals for controlling the image generator and the motion base controller in accordance with the input signals.

8 Claims, 9 Drawing Sheets

INTERACTIVE RACE CAR SIMULATOR SYSTEM

FIELD OF THE INVENTION

The invention relates to simulator systems and, more specifically, to interactive car simulator systems.

BACKGROUND OF THE INVENTION

Systems which simulate vehicles are known. Such simulator systems typically incorporate a motion base for providing movement in a limited space, and a driver module mounted on the motion base where a user, or "driver", of the simulator system sits. The driver module may include a mock-up of a vehicle. Movement of the motion base is coordinated with displayed images, thereby providing the driver with a sense that the simulator system is traveling.

Known motion bases are powered by electric or hydraulic actuators. Although electric actuators are capable of generating high forces, and thus strong movements of the driver module, such actuators are expensive and difficult to repair. Thus, faulty electric actuators are usually replaced, adding to the already significant expense associated with the use of such actuators. Hydraulic actuators are difficult to operate and maintain because they require hydraulic fluid which can leak out of the actuators. Furthermore, in conventional hydraulic motion bases for vehicle simulators, it is difficult to achieve "smooth", realistic motion effects in vehicle simulation rides. A motion base incorporating hydraulic actuators is particularly likely to lurch or jerk the driver when simulating a sudden start or stop. Such drawbacks are the result of the fact that hydraulic fluid is incompressible, causing most of the acceleration forces to be ultimately transmitted to the driver. Leakage of the fluid also increases the costs associated with using hydraulic actuators, since precautions against leakage must be taken when transporting the motion base.

Although pneumatic actuators do not suffer the above-described drawbacks of hydraulic actuators, pneumatic actuators have not been used often in motion bases. Since air is compressible, it is difficult to precisely control pneumatic actuators under varying loads and desired motion objectives, such as a desired velocity.

In addition to motion bases, vehicle simulator systems also include one or more user input devices, such as a steering wheel, to control the simulation. For added realism, the steering wheel of the simulator should also generate "feedback" to the driver. This feedback is torque which provides the driver with the same resistance as the forces that would be transmitted from the wheels of an actual moving car through a steering system to the steering wheel. Unfortunately, steering wheel input devices are constrained by many of the same drawbacks as motion bases, as described above. Furthermore, a hydraulic or electric steering wheel input device cannot easily apply a smoothly-varying force, as would the steering wheel of a car.

Another component of vehicle simulator systems is a display system for presenting images to the rider. Such images may represent the vehicle's surroundings, "heads-up" control panel displays, maps and charts, and any other images which enhance the simulator experience. In a car simulator, an image presentation apparatus preferably presents an image in front of the driver in an area corresponding to the windshield of an actual car. One implementation of such a presentation apparatus is to provide a computer monitor or television screen at a location corresponding to the windshield of the car.

It is preferred that the image presentation apparatus present the images in an area corresponding to the windshield because viewing an image at a close range causes the driver to be "immersed" in the image. The image fills the driver's field of view so that the driver is not distracted by other sights. The sense of immersion in the image thus creates a "virtual reality" which is very convincing. Unfortunately, in systems having such monitors directly in front of the driver, the driver sees the displayed images at a very close viewing distance in the "near field", causing eye strain. Such eye strain problems are common when, for example, viewing large front-screen or rear-screen projections at a close range.

A video screen at a close viewing distance is further disadvantaged by an inability to present images having "depth". Without a large distance between the presented image and the viewer, the presented images are not in the "far field" and thus have no depth. Without a perceived "depth" in the image, the driver cannot approximate distances within the image, resulting in an unrealistic simulation. In addition, small video screens or computer monitors cannot provide a large enough image to immerse the driver, while large video screens are prohibitively expensive.

Still another component of vehicle simulator systems is an image generator. The above-described presentation apparatus for presenting images cooperates with the image generator which creates the images. In known car simulator systems, the generated images are merely computer-generated graphics which do not resemble video or photographic quality images. Known car simulator systems are thus not very realistic because of the low quality of images generated by such systems. Computers capable of generating realistic, video quality images in real-time are very expensive, and thus not feasible for use in an entertainment device such as a race car simulator. Less expensive computers either cannot generate realistic images, or generate images at a rate which is too slow to provide the appearance of continuous motion.

Other image generators generate images in accordance with pre-recorded video or film images. Although these images are realistic, the images are predetermined and cannot be manipulated. For example, such image generators cannot show an image from a different point of view than that of the original recording. Thus, these image generators are unacceptable for use with interactive car simulator systems since they are unable to display images which change in accordance with the driver's action.

The image generator in an interactive car simulator system must display images of scenery, such as a race track and surrounding landscape, as well as images of visual elements, such as other cars, which move independently against the background of the scenery. Image generators in known interactive simulators are unable to display realistic, independently-moving visual elements. As described above, known image generators either use computer-generated graphics for the visual elements, or use static, pre-recorded photographic images of visual elements.

While computer-generated graphics are unrealistic, too expensive or too slow, pre-recorded photographic images are limited in that they cannot show visual elements from arbitrary points of view, as is required in an interactive simulator system. Though such pre-recorded images may be moved within the "virtual world" of the scenery, they cannot exhibit perspective shifts which would occur as the visual elements move. One attempt to ameliorate these drawbacks of pre-recorded images is to use pre-recorded video 'clips' which are a series of images of a visual element at different sizes. However, even if the image generator uses pre-recorded video 'clips' of visual elements, such clips are also static and do not allow for dynamic, interactive changes in perspective.

SUMMARY OF THE INVENTION

It is an object of the present invention to provide an interactive vehicle simulator system which utilizes a pneumatic motion base to impart motion to a driver.

It is a further object of the present invention to provide an interactive vehicle simulator system which presents images at a close viewing distance from the driver, but which does not cause eye strain.

It is a further object of the present invention to provide an interactive vehicle simulator system which presents images having a perceived depth.

It is a further object of the present invention to provide an interactive vehicle simulator system which generates realistic video-quality images in accordance with the input actions of the driver.

According to the present invention, an interactive, vehicle simulator system receives input signals indicative of actions of a user who is located in a driver module. The simulator system also displays images and moves the driver module in accordance with the input signals. The simulator system comprises an input device for generating the input signals, an image generator, an image presentation apparatus, a motion base, a motion base controller and a game controller.

The image generator receives signals indicative of a first set of processed, pre-recorded digital images, and generates signals indicative of a second set of digital images. The second set of digital images is indicative of a select number of the first set of processed, pre-recorded digital images as seen from a desired point-of-view which has a desired velocity. The image presentation apparatus receives the signals indicative of the second set of digital images and generates in dependence thereupon the second set of digital images, which it presents to the user.

The motion base is connected to the driver module and thus moves the driver module along at least one axis in accordance with motion base control signals. The motion base controller is in signal communication with the motion base and generates the motion base control signals. The game controller is in signal communication with the input device, the motion base controller and the image generator, and generates signals for controlling the image generator and the motion base controller in accordance with the input signals.

DESCRIPTION OF PREFERRED EMBODIMENT

The present invention is described with respect to an interactive race car simulator system, but those skilled in the art will recognize that the present system is readily adaptable to other interactive, simulator-related applications as well as to other fields. These other simulator-related applications include those in which an interactive system must present realistic images which depend on received input actions from a user.

The following is a short glossary of terms used herein.
Playback
 Retrieving, processing, and displaying images
Point-of-View (POV)
 The apparent position and orientation from which an image of a virtual world is seen.
View Volume
 The portion of the virtual world which is visible from a point of view.
Virtual World
 The set of visual elements seen in the images, wherein each visual element has a position, a surface geometry and surface imagery.
Visual element
 An object or group of objects in the virtual world which move relative to a point of view.

Figure 1:
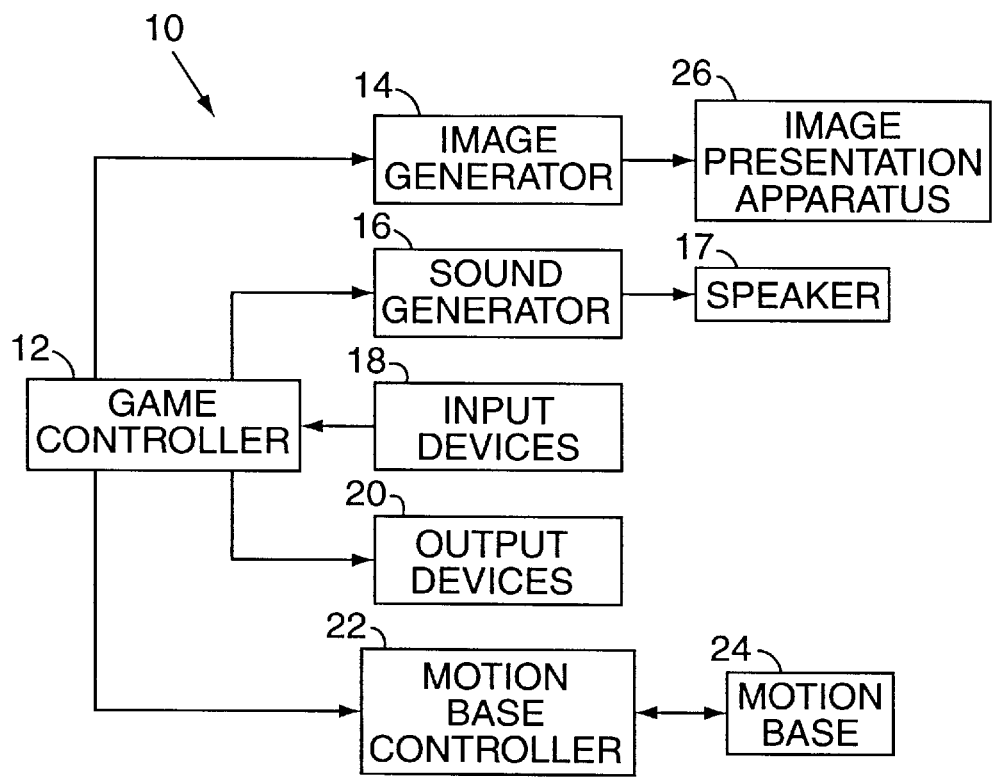
FIG. 1 is a schematic illustration of an interactive race car simulator system provided in accordance with the present invention.

FIG. 1 is a schematic illustration of an interactive race car simulator system 10 provided in accordance with the present invention. The components of the simulator system 10 are presented immediately below and then described in detail thereafter. The simulator system 10 has a game controller 12, typically a computer-based controller, which coordinates the actions of other simulator system components in a manner described below. An image generator 14 generates signals indicative of images, such as scenery and other race cars on a race track, as seen from the point-of-view position, with respect to a global coordinate system, of a car which drives along the track. The images are generated in accordance with input signals from a user, or driver, of the simulator system 10, thereby making the simulator system interactive. The generated images are presented to the user by an image presentation apparatus 26. A sound generator 16 generates signals indicative of audio output, such as the sounds of race car engines, tires squealing and crashes. The audio output signals are presented to a standard speaker 17, such as a speaker in a conventional computer or a larger, high fidelity speaker, which transforms the audio output signals to sound.

Inputs devices 18 present the game controller 12 with signals indicative of user inputs, such as the actuation of acceleration and brake pedals and the movements of a steering wheel. Similarly, the game controller 12 provides signals which control user outputs 20, such as activating car door locks or causing physical resistance (torque) in the movements of the steering wheel. Finally, the game controller 12 directs the actions of a motion base controller 22, which in turn directs the movements of a motion base 24 supporting a driver module (not shown in FIG. 1) where the user sits. As described hereinbelow, the motion base determines the position, velocity, and acceleration of the driver module along three degrees of freedom.

Figure 2:
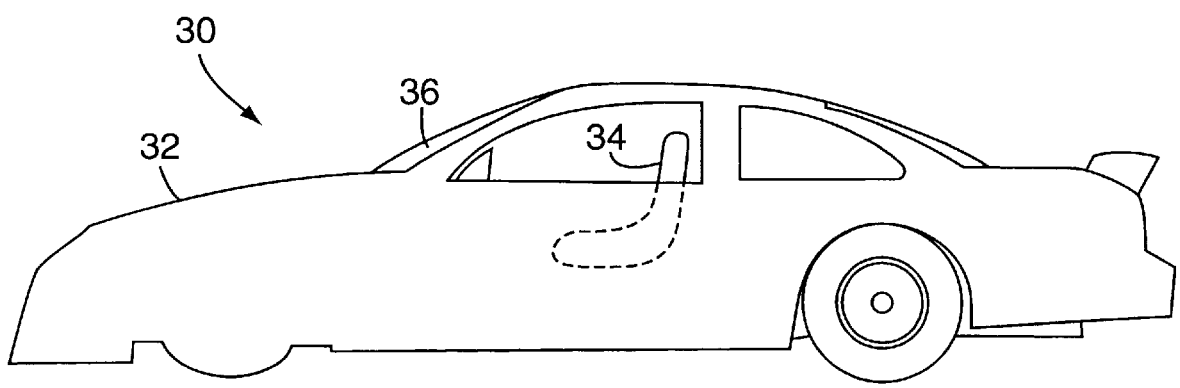
FIG. 2 is a driver module of the interactive race car simulator system.

FIG. 2 shows the driver module 30 in which the user sits. The driver module 30 comprises a race car body 32. Inside the body 32 are a driver-side seat 34 and a passenger-side seat (not shown in FIG. 2), as well as a windshield display 36. Also mounted inside the body 32 are input devices (not shown in FIG. 2), such as a steering wheel with resistance feedback, an accelerator pedal and a brake pedal, and output devices (not shown in FIG. 2), such as a door lock. The input devices and output devices are preferably located in locations corresponding to the locations of such devices in an actual car, e.g. the accelerator and brake pedals are located on the floor of the driver-side, and the steering wheel is located within arm's reach of the driver-side seat. It will be understood by those skilled in the art that many other types of input and output devices may be utilized without departing from the spirit and scope of the present invention. For example, a stick-shift input device and a clutch pedal input device may be used in other embodiments of the present invention.

The accelerator and brake pedals are each connected to a sensor, such as a potentiometer, which generates signals indicative of the degree to which the pedal is depressed. The pedals are preferably implemented with a Happ 50-8060-01 Dual Pedal with dual potentiometers, sold by Happ Controls, Inc. As shown in FIG. 1, the signals generated by the input devices 18 are presented to the game controller 12. Thus, when the user actuates a pedal, indicating an acceleration or a braking action, the game controller 12 receives signals from the pedal and can direct the actions of other simulator system components accordingly, as is described hereinbelow.

The steering wheel is an input device for generating signals indicative of the degree to which the steering wheel is rotated by the user, thereby indicating the desired direction of motion of the simulated "race car". In the preferred embodiment, the steering wheel is not only an input device but is also an output device which applies resistance to being rotated, much as a steering wheel in an actual car provides resistance to being rotated in dependence on the motion of the car. The steering wheel is connected to a rotary sensor that generates signals indicative of the amount and direction of rotation of the steering wheel. One such rotary sensor is the D-F59 sold by SMC Pneumatics, Inc. The steering wheel is further connected to a rotary pneumatic actuator and flow valve which apply torque to the steering wheel in dependence on signals received from the game controller 12 (FIG. 1). The rotary actuator is preferably a NCDRA1FSU50-100 and the flow valve is preferably a NVEP3121-1-02, both sold by SMC Pneumatics, Inc. The game controller 12 may determine the amount of torque applied to the steering wheel in accordance with many processes. For example, the torque may be proportional to the simulated centrifugal force imposed on the car as determined by the car's velocity and change in direction of motion.

Figure 3:
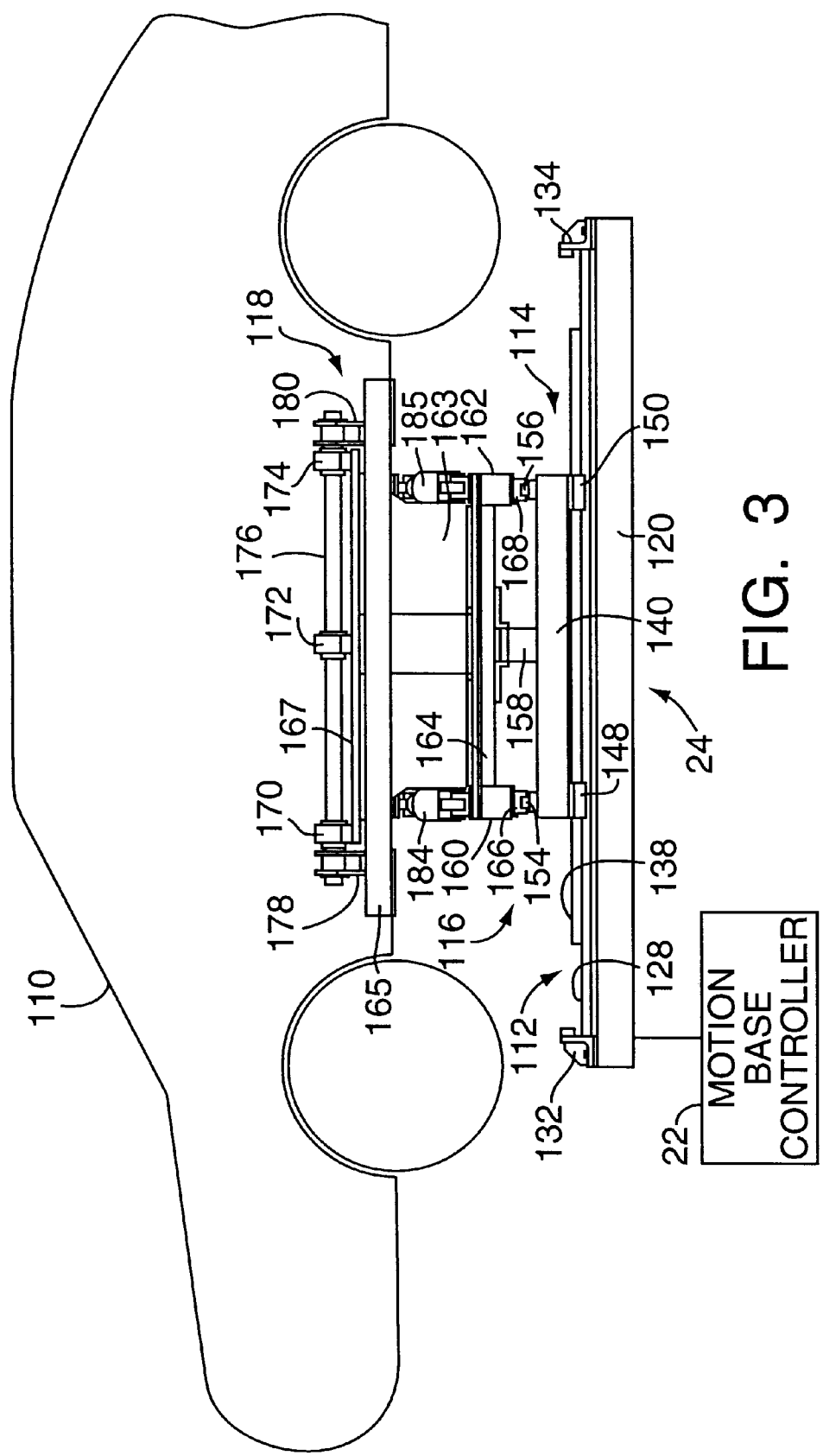
FIG. 3 is a schematic view of a motion base and a compartment carried by a swing of the motion base in accordance with the present invention.

Turning now to FIG. 3, the motion base controller 22 is illustrated connected to the motion base 24, which in turn carries a driver module or compartment 110 in which a driver is positioned during the game. The motion base 24 includes a slide 112, which rests on an appropriate support surface such as a floor (not shown), a top frame 114, which is supported for linear movement on the slide 112, a Y-table 116, which is supported for linear movement along the top frame 114, and a swing 118, which is supported for pivotal movement relative to the Y-table 116.

Figure 4:
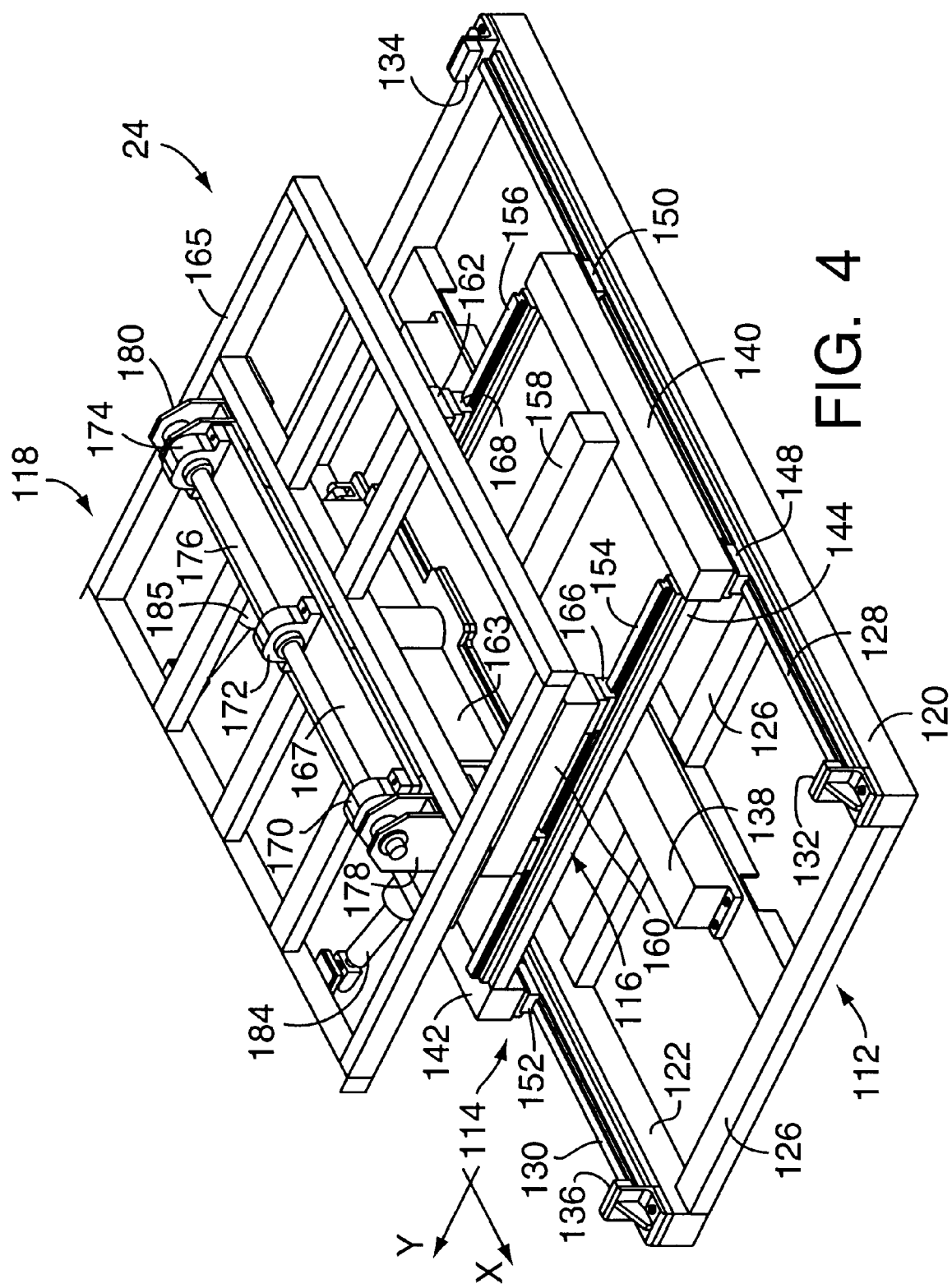
FIG. 4 is perspective view of the motion base of FIG. 3.

As shown in FIG. 4, the slide 112 includes a frame having two parallel frame members 120, 122, which are connected by several cross-members 126. Each frame member 120, 122 carries a respective rail 128, 130, and each rail has associated stops 132, 134, 136 (only three shown) positioned at the respective ends. A fluid motor, such as a pneumatic cylinder 138 is mounted to the cross members 126 and parallel to the rails 128, 130.

The top frame 114 includes top frame members 140, 142, which extend parallel to the rails 128, 130 associated with the frame, and also includes top frame cross members 144, 146 (one shown). The top frame members 140, 142 each carry a pair of guides 148, 150, 152 (three shown), which cooperate with respective rails 128, 130 of the frame, in order to provide linear movement of the top frame 114 relative to the stationary frame 112. For convenience, this motion is referred to herein as motion in the X-direction. Movement of the top frame 114 relative to the frame 112 is effected by a post (not shown in FIGS. 3 and 4) which is coupled to the pneumatic cylinder, in accordance with the actuation of the cylinder by the motion base controller 22, as is described below.

The top frame 114 also carries a pair of top frame rails 154, 156, which in the illustrated embodiment are oriented perpendicular to the frame rails 128, 130. As shown in FIG. 3, the rails each have a generally X-shaped cross section, and associated guides have a corresponding C-shaped cross section, so that the guides are retained on but slidable relative to its associated rail. While not shown, stops are provided at the ends of the top frame rails 154, 156. A fluid motor, such as a pneumatic cylinder 158 is mounted to the top frame members 140, 142 and parallel to the top frame rails 154, 156.

The Y-table 116 includes table members 160, 162, which extend parallel to the top frame rails 154, 156, and also includes Y-table cross members 164 (one shown in FIG. 3). The Y-table members 160, 162 each carry a pair of guides 166, 168 (two shown) similar to the guides described above, and which cooperate with respective top frame rails 154, 156, in order to provide linear movement of the Y-table 116 relative to the top frame 114. For convenience, this motion is referred to herein as motion in the Y-direction. Movement of the Y-table 116 relative to the frame 112 is effected by a cross member 164 (FIG. 3) which is coupled to the pneumatic cylinder 158, in accordance with the actuation of the cylinder by the motion base controller 22.

Figure 5:
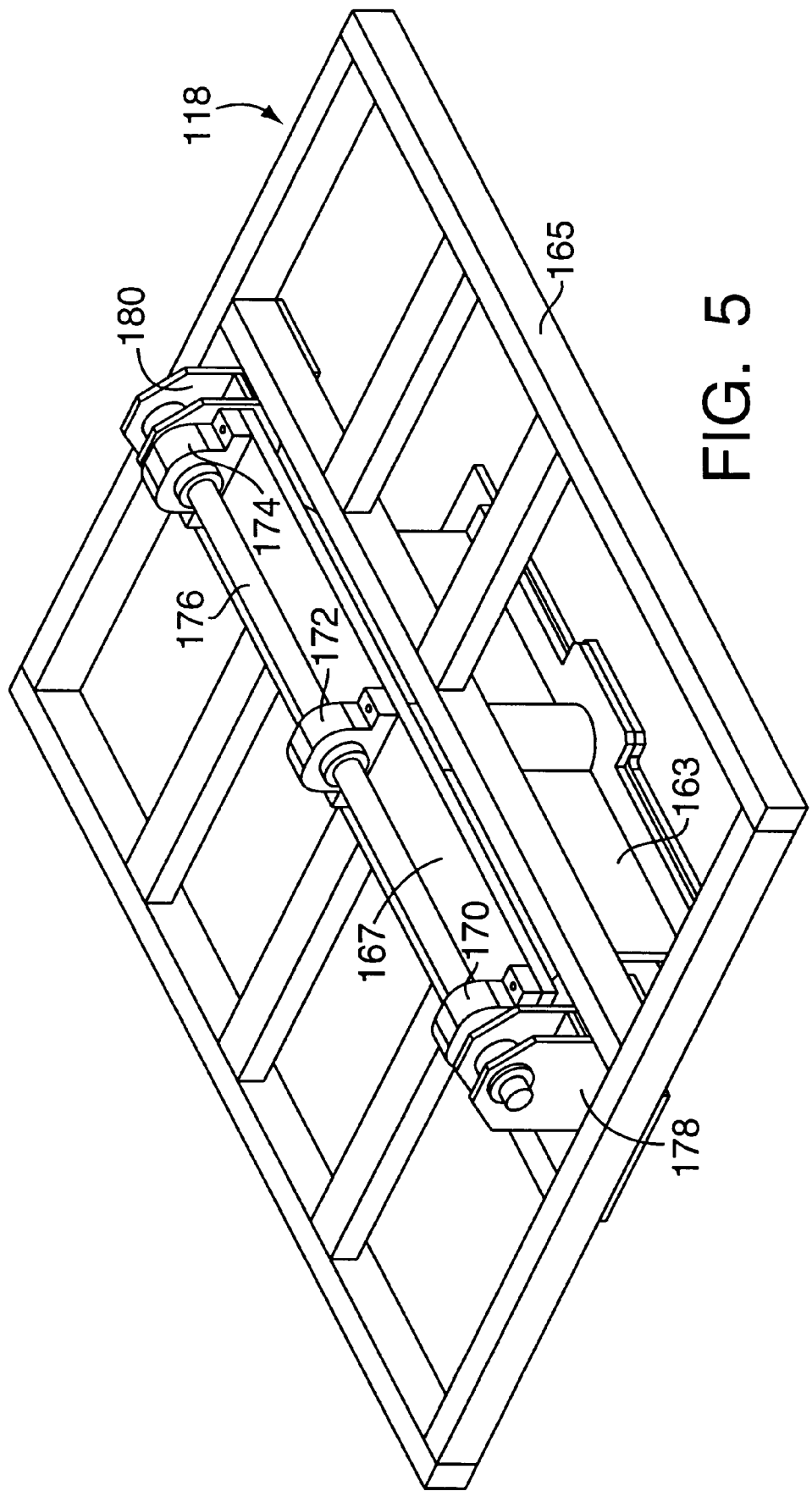
FIG. 5 is a perspective view of the swing of FIGS. 3 and 4, illustrating the swing in more detail.
Figure 6:
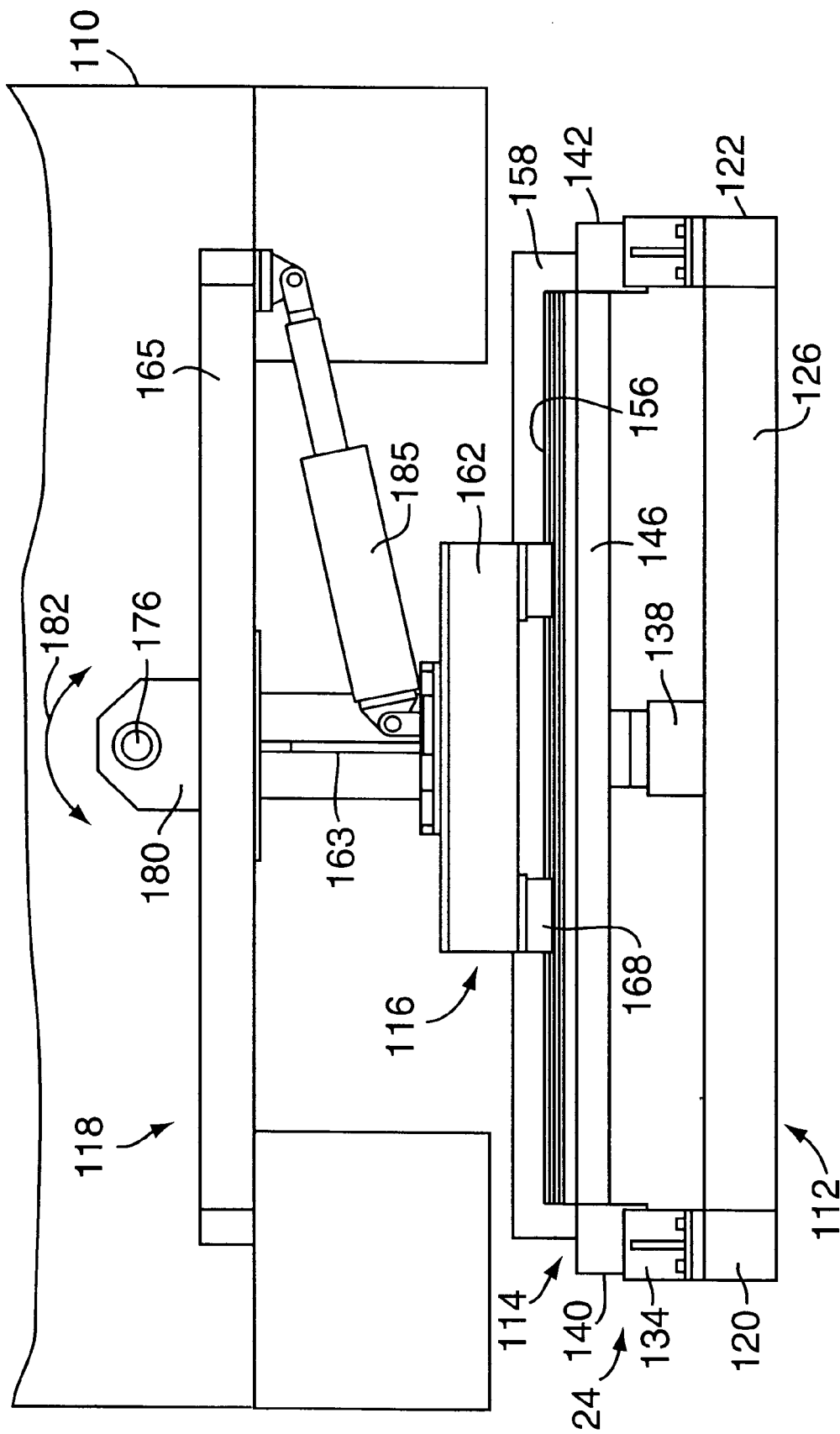
FIG. 6 is a partially-fragmentary, side elevational view of the motion base of FIGS. 3 and 4.

As shown in FIGS. 4, 5 and 6, the swing 118 includes a post 163 which is rigidly attached to the Y-table 116. The post carries a generally-rectangular vehicle frame 165, upon which the driver compartment 110 is mounted (FIG. 3). Bearings 170, 172, 174 are mounted along the top plate 167 of the post 163, and supports a shaft 176, which passes through each bearing. A pair of brackets 178, 180 are mounted to the vehicle frame 168 and receive respective ends of the shaft 176, in order to enable pivotal movement of the vehicle frame 165 and compartment 110 relative to the rest of the motion base, as indicated by the arrow 182 (FIG. 6). In the illustrated embodiment, the pivotal movement 182 occurs about an axis oriented parallel to the X-direction. Another fluid motor, such as a pair of pneumatic cylinders 184, 185, is coupled to the vehicle frame 165, and also to the post 163 and/or the Y-table, to provide pivotal movement of the vehicle frame about a pivot axis relative to the Y-table and the rest of the motion base, in accordance with the actuation of the cylinder by the motion base controller 22. Those skilled in the art will recognize that, in the illustrated embodiment, the pivot axis is parallel to the direction of forward movement of the vehicle. Thus, the axis is a roll axis, and enables the motion base to simulate roll of the vehicle during the simulated race or other event, for example as the vehicle turns.

The shaft 176, and thus the axis, is positioned above a plane defined by the vehicle frame 165. Such an arrangement, i.e., the weight of the frame positioned below the pivot axis, tends to provide a more stable platform and also tends to urge the vehicle frame into a level position in the event that the pneumatic cylinders 184, 185 fail. In addition, since most of the weight of the vehicle frame 165, compartment 110 and driver is carried by the post, the force applied by the cylinder can be used to effect movement of the vehicle frame, or a less-powerful cylinder may be employed.

Returning to FIGS. 3 and 4, the motion base includes position and velocity sensors for detecting movement of the top frame 114 relative to the frame 112, and the Y-table 116 relative to the top frame. Also included are rotational position and rotational velocity sensors for detecting movement of the swing 118 relative to the Y-table 116. The sensors generate positional and velocity signals which are presented to the motion base controller 22, and are subsequently used by the motion base controller 22 to coordinate movement of the motion base 24, and thus of a driver sitting in the compartment 110, with the change of images presented by the image presentation apparatus 26, as is described below.

As shown schematically in FIG. 3, a first position sensor is a liner encoder associated with the frame 112 and top frame 114. The linear encoder is of a known type, such as a Tempsonics Radiowave Position Transducer, and includes a linear scale 186 attached to the member 120 of the frame 112, and an associated encoder head 188 mounted to the top frame 114. The scale 188 generates a first signal indicative of the position of the head relative to the scale, and thus the position of the top frame 114 relative to the frame 112. The first position signal may be used in conjunction with a clock signal to determine the velocity of movement, or a separate velocity sensor may alternatively be used.

A second position sensor is associated with the top frame 114 and the Y-table 116. The second position sensor is also a linear encoder of a known type, such as the model Tempsonics Radiowave Position Transducer described above, and includes a linear scale 190 attached to the cross member 144 of the top frame 114, and an associated encoder head 192 mounted to the Y-table 116. The scale 190 generates a second signal indicative of the position of the head relative to the scale, and thus the position of the Y-table 116 relative to the top frame 114. The second position signal may be used in conjunction with a clock signal to determine the velocity of movement, or a separate sensor such as an accelerometer and a clock may alternatively be used to determine relative velocity. A rotational position sensor is associated with the swing 118 and the Y-table 116. The rotational position sensor is illustrated in FIG. 5 as a rotational encoder of a known type, such as a Schaevitz RVIT, and includes a rotary scale 194 attached to bearing 170 mounted to the post 163 and a rotary encoder head 194 mounted to the adjacent bracket 178. As previously described, the bracket rotates relative to the post and the bearings to enable pivotal movement of the swing and vehicle frame relative to the remainder of the motion base. The scale 194 generates a signal indicative of the rotational position of the bracket 178 relative to the scale, and thus the rotational position of the vehicle frame 165 relative to the Y-table and the remainder of the motion base. The rotational position signal may be used in conjunction with a clock signal to determine the velocity of rotational movement, or a separate sensor such as an accelerometer and a clock may alternatively be used to determine relative rotational velocity. Alternatively, the linear and rotational positions and velocities may be determined using sensors associated with the pneumatic cylinders, 138, 158, 184 and 185. Such an arrangement may also be used to complement the sensors and signals described above.

Figure 12:
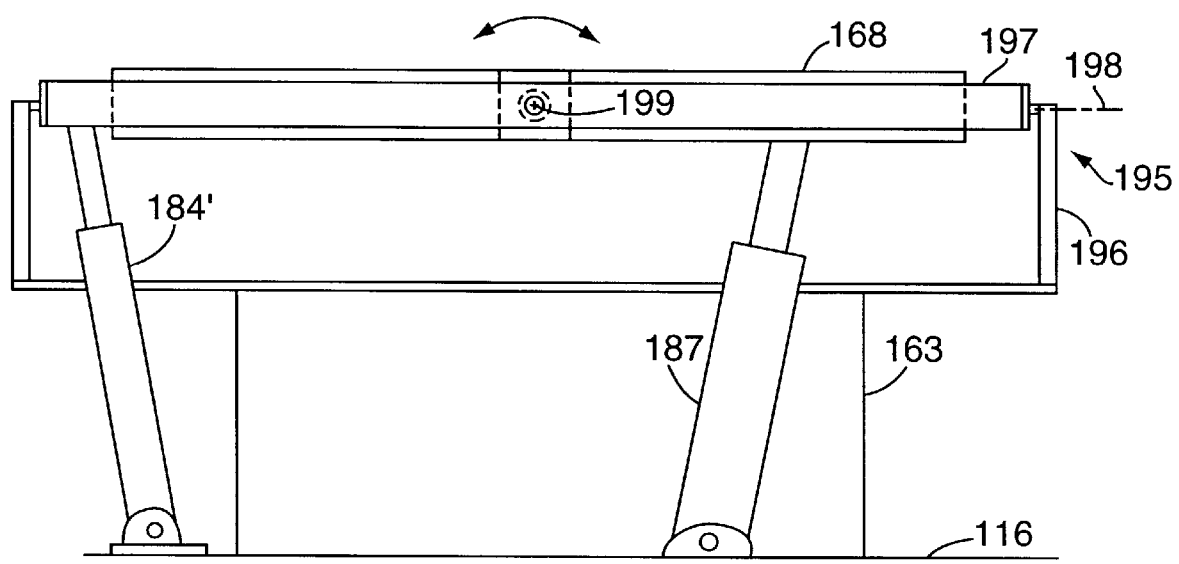
FIG. 12 is a schematic view of a second embodiment of a swing similar to the swing of FIGS. 4 and 5, but illustrating a vehicle frame of the swing supported for movement of the vehicle frame about two pivotal axes.

In an alternative embodiment illustrated in FIG. 12, the vehicle frame 168 is supported on the post 163 for pivotable movement relative to the Y-table 116 about two axes. In order to effectively utilize relatively small pneumatic cylinders to move the vehicle frame (and a driver) about the two axes, it is important that the weight of the vehicle frame and associated passenger compartment and passenger be supported by means other than the cylinders substantially by a member between the post which is fixed to the Y-table, and in the illustrated embodiment, the vehicle frame is illustrated as being supported by a gimbal arrangement 195. Other arrangements, such as a universal joint, which enable movement about two axes may also be employed. In the preferred embodiment, the first axis represents a roll axis, and the second axis is a pitch axis.

As illustrated in FIG. 12, the vehicle frame 168 is coupled to the post 163 by the gimbal arrangement 195, which includes a first bracket 196 fixed to the post 163 (or alternatively directly to the Y-table 116). A second bracket 197 is coupled to the first bracket 196 for movement about a first pivot axis 198. The second bracket is illustrated as being positioned within the first bracket, although the arrangement can be reversed as needed. The vehicle frame 168 is coupled to the second bracket 197 for movement about a second pivot axis 199, as indicated by the arrow positioned adjacent to the axis 199. The vehicle frame is illustrated as being positioned within the second bracket, although the arrangement can be reversed as needed. Movement of the second bracket 197, and thus of the vehicle frame 168 and a driver (not shown), about the first axis 198 is provided by a pneumatic cylinder 184' coupled to the Y-table 116 (or alternatively to the post 163) and to the second bracket 198. Movement of the vehicle frame 168 about the second axis 199 is provided by another pneumatic cylinder 187 coupled to the Y-table 116 (or alternatively to the post 163) and to the second bracket 198. The cylinders may include associated position and velocity sensors (not shown in FIG. 12), similar to those described above, and operation of the pneumatic cylinders 184', 187 is performed as described above in order to coordinate movement of the motion base to accompanying images.

As described hereinabove, the motion base controller 22 (FIG. 3) generates motion base control signals which cause actuation of one or more of the motion base cylinders. As also described hereinabove, due to the compressibility of air, pneumatic cylinders have in general been difficult to control precisely. To overcome this difficulty, the motion base controller 22 provided in accordance with the present invention generates motion base control signals in accordance with a trained response process, as described below.

Figure 7:
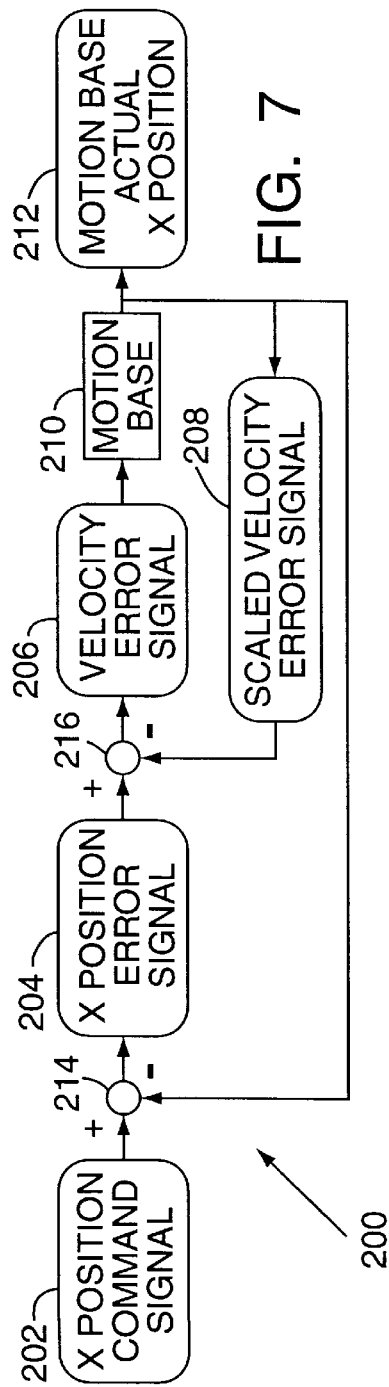
FIG. 7 depicts data flow diagrams illustrating a preferred method of training the motion base controller.

FIG. 7 shows a data flow diagram illustrating a preferred method of training the motion base controller, though many other training processes are known and may be used with the present invention. In general, the motion base controller is first "trained" off-line to operate with a specific motion base. Then, the trained motion base controller is able to accurately control the specific motion base. If the motion base is substantially modified, e.g. if the existing motion base is replaced with a new motion base of a vastly different weight or with more degrees of freedom, then the motion base controller would be retrained on the new motion base.

During training, the motion base controller generates motion base control signals indicative of specific commands, such as a command to move the motion base to a prescribed position. Typically, the magnitude of the motion base control signals is proportional to the desired magnitude of the commanded motion. FIG. 7 shows an X position training process 200 for training the motion base controller 22 to control movement along the X axis. The training process 200 is similarly applicable to training the motion base controller 22 to control movement along the Y or roll axes. An X Position command signal 202, such as would be generated by the motion base controller 22, causes movement along the X axis to an actual X position which is in general different from the commanded X position. After the command is performed by the motion base, the motion base controller 22 receives, from the above-described motion base sensors, signals indicative of the actual performance of the motion base, such as the actual X position signal 212. As shown by the signal addition point 214, the actual X position signal 212 is subtracted from the X position command signal 202 in subsequent training iterations.

The motion base controller furthermore compares the commanded action with the performed action, and generates in dependence thereupon an error signal. FIG. 7 shows one such error signal, an X Position error signal 204 indicative of the erroneous position along the X axis. For example, if the motion base controller commands the motion base to move 5 inches along the X axis, and in response the motion base actual moves 5.5 inches along the X axis, the motion base controller generates an X position error signal indicative of the 0.5 inches of extra movement along the X axis.

An error in the intended velocity (change in position divided by the time to change position) is calculated from the X position error signal 204. The velocity error signal is denoted by reference numeral 206 in FIG. 7. This velocity error signal 206 is amplified/attenuated by a scaling factor, yielding a correction signal or scaled velocity error signal 208. As shown by the signal addition point 216, the scaled velocity error signal 208 is subtracted from the X position error signal 204 in subsequent training iterations.

Because the motion base controller receives signals indicative of the actual results of its command signals, it is known in the art as a "closed-loop" system. As is also known in the art, closed-loop systems are generally tolerant of variations in performance. Accordingly, the motion base controller 22 described herein is capable of precisely controlling the motion base 24 over a wide range of desired position, velocity and acceleration commands.

As described hereinabove, a pneumatic motion base is more difficult to control than other types of motion bases. However, a significant advantage of motion bases which utilize pneumatic actuators, rather than hydraulic or electric actuators, is that such motion bases provide smoother, more realistic motion. By contrast, conventional simulator motion bases are likely to lurch or jerk the driver when simulating a sudden start or stop.

Figure 8:
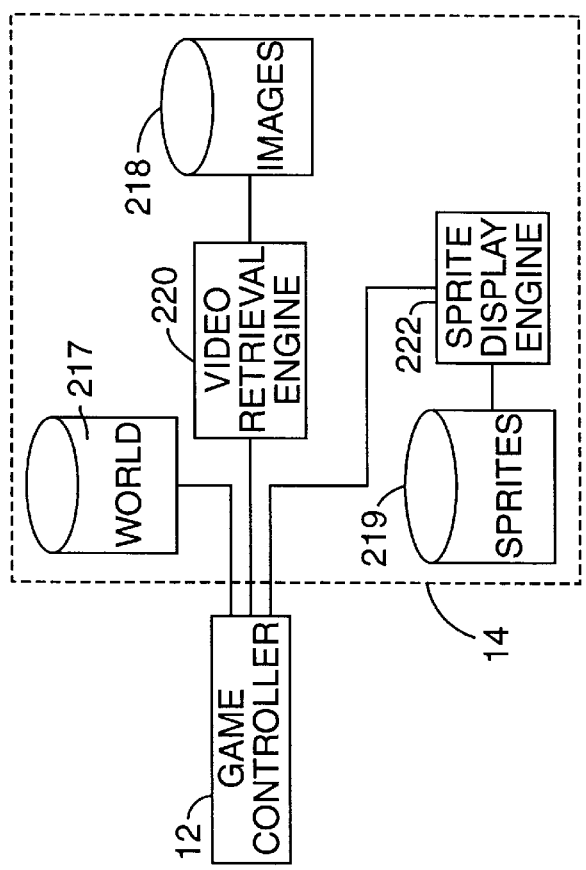
FIG. 8 is a schematic illustration of a view volume defined by a camera and a source image.

Turning now to FIG. 8, a more detailed schematic illustration of the image generator 14 is shown. The image generator 14 comprises databases 217, 218, 219 for storing signals indicative of images, position and shape of visual elements in the virtual world, as well as engines 220, 222 for retrieving the signals from the databases 217, 218, 219 and for further processing the signals, as described hereinbelow. Each of the components of the image generator 14 is likewise described in detail below.

In the present invention, image generation requires the following steps: (1) pre-recording a first set of digital images, (2) processing the first set of pre-recorded digital images and (3) generating a second set of digital images in dependence on the processed, pre-recorded digital images and in dependence on the input actions of the user. The second set of digital images represents the first set of images as seen from a desired viewpoint which has a desired velocity. Each of these steps is described hereinbelow and illustrated by the flow chart shown in FIG. 11.

To pre-record a first set of digital images, a conventional video camera records images as the camera circles a race track. Typically, the camera has an 18 millimeter lens and is mounted on a race car which drives once around the race track. The camera preferably records 1,720 frames of video comprising images of the race track scenery from several positions and orientations.

The recorded images are then "digitized" to generate a set of digital signals which are indicative of the images and which are also suitable for storage and manipulation by a computing platform. A conventional digitizer generates, from the recorded images, a set of digital signals indicative of the frames of video. For each frame, the digitizer generates digital signals indicative of a two-dimensional array of pixels. In the preferred embodiment, each frame is 640 pixels wide and 210 pixels high, and each pixel is represented by two bytes. The signals indicative of the pixels are stored on a conventional digital storage medium, such as a hard disk drive or random access memory (RAM). Thus, each frame requires 640×210×2=268,800 bytes of storage space, and the entire 1,720 frames of digitized video images require 462,336,000 bytes of storage space.

In another embodiment of the present invention, the camera which records the images of the race track scenery is a digital camera which directly generates digital signals indicative of frames of video. In such an embodiment, a digitizer is unnecessary, since the recorded images are already in digital form. In still another embodiment, the first set of digital images are not generated in accordance with frames of video, but are instead generated in accordance with photographs. In still further embodiments of the present invention, multiple cameras, instead of a single camera, simultaneously record images from different points of view. In such embodiments, an entire 360 degree source image can be generated.

As used hereinafter, the term "source image" refers to a recorded image indicative of an instant of time. Thus, "source image" may refer to either a digitized frame of video or a digitized photograph, and a set of such source images form the first set of digital images.

Figure 11:
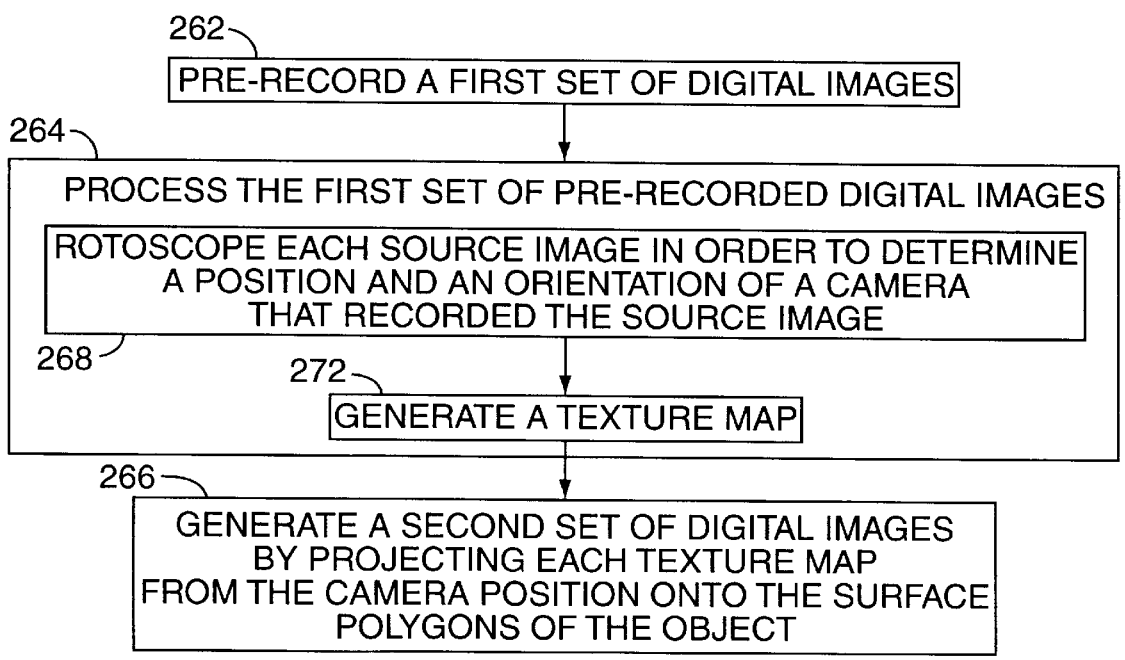
FIG. 11 is a flow chart showing a process of image generation.

After the first set of digital images are pre-recorded, as shown by step 262 in FIG. 11, the image generator 14 (FIG. 1) processes the first set of pre-recorded digital images, as shown by step 264. The processing step 264 maps each source image onto a computer-based model of those visual elements, such as walls and cars, which are depicted in the source images. The model of the visual elements is stored in a database 217. The model is three-dimensional and includes the surface geometry of the visual elements as well as the position of the visual elements in terms of a global coordinate system. The surface geometry of each visual element is typically represented as a collection of triangles or other polygons, known as a "polygon" model in the computer graphics art, while the position of each visual element is typically represented in three-dimensional Cartesian coordinates.

In the preferred embodiment, the computer-based model of visual elements is manually created by visually inspecting the first set of digital images and by estimating the position and appropriate polygon model for each visual element. After the model is created, each source image is "rotoscoped" (step 268 in FIG. 11) to determine the position and orientation of the camera that recorded the source image. Rotoscoping is known in the art, and may be performed with standard software, such as Wavefront sold by Microsoft Corporation. Rotoscoping a source image comprises the following steps:

(1) providing an estimated position and orientation, in model coordinates, of the recording camera at the time the source image was recorded, (2) displaying the source image, (3) generating a wire frame image of the model as seen from the estimated camera position and orientation, (4) superimposing the wire frame image on the source image, and (5) adjusting the estimated camera position and orientation, by standard rotation and translation operations in all three dimensions, so that the edges of the visual elements in the wire frame image are substantially aligned with the edges of the visual elements in the source image.

Once rotoscoping establishes the position and orientation of the camera for each source image, the image generator 14 (FIG. 1) performs a step 272 (FIG. 11) known in the art as generating a texture map from each source image. Creating a texture map may be performed by software or preferably by such computer hardware devices as the PowerVR board sold by Video Logic, Inc.

Figure 13:
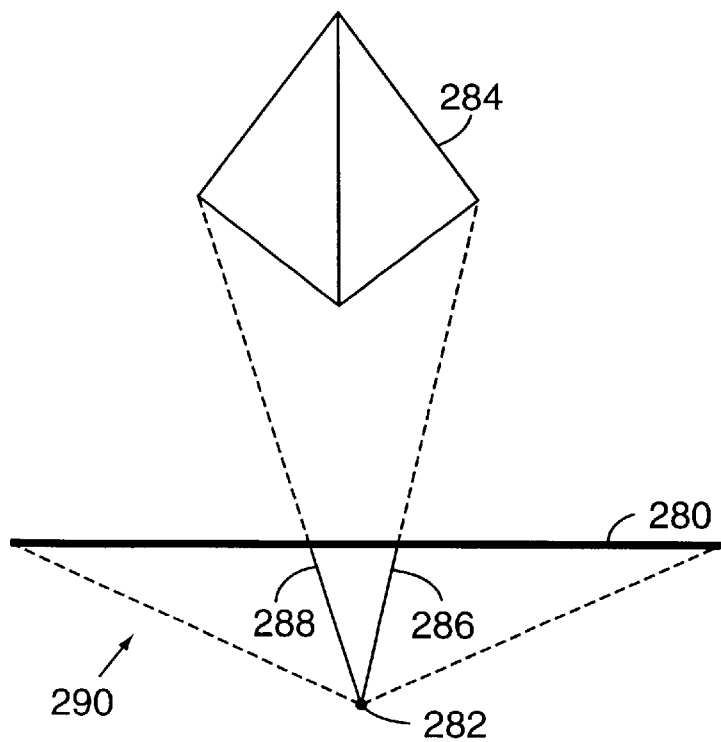
FIG. 13 is a schematic illustration of a visual element and image plane for purposes of creating a texture map.

As is known in the art, generating or creating a texture map from a source image generally consists of the following steps explained below and illustrated by the schematic illustration in FIG. 13:

(1) placing the source image on an "image plane" 280 between a point-of-view position 282 and the polygon model 284 of each visual element so that, as during the step of rotoscoping, the edges of the visual elements in an image thereof are substantially aligned with the edges of the visual elements in the source image, (2) "clipping" polygons at the clip planes defined by the projections from the point-of-view position through the edges of the visual elements. New vertices are created as necessary, such as where a polygon intersects a clip plane. In the preferred embodiment, all polygons are triangles, and clipping may create a quadrangle. If so, the quadrangles are converted to two triangles, as is well known in the art.

(3) projecting rays 296, 288 (only two shown) from the point-of-view position 282 to each vertex of the polygon model 284 which is "visible" (not "obscured" by polygons closer to the camera position) within the view volume 290. The view volume 290 is a pyramid with a rectangular-base, and is defined by the point-of-view position 282 and the four corners of the source image in the image plane 280. The intersection of the rays with the image plane 280 define a "silhouette" of projected polygon vertices onto the image plane, much as a light source projects the outline of a visual element onto a wall behind the visual element, forming a silhouette. However, in generating a texture map, the plane 280 on which the "silhouette" is formed is between the polygon model 284 of the visual element and the point-of-view position 282. By contrast, a silhouette formed by a light source lies in a plane which is not in between the visual element and the light source.

(4) for each visible polygon, defining an inverse perspective transformation for translating points in a plane to points on a polygon. By using the three-dimensional coordinates of the polygon, and applying the inverse perspective transformation to those pixels which are within the area of the source image bounded by the silhouette of the polygon, the pixels are mapped onto the polygon.

After each texture map is generated, the above-recited step 264 of processing the first set of pre-recorded digital images is complete. The first set of processed, pre-recorded digital images is stored in an image database 218 (FIG. 8) and used in generating a second set of digital images. The image database is stored on a fast Redundant Array of Independent Disks (RAID) system. The RAID is preferably a dual, ultra-wide channel, six-disk, high-speed drive, having an 8 millisecond seek time, an 8 millisecond latency, and a minimum burst rate of 40 Mbytes per disk. For each source image, equal portions of the source image are stored on each disk at the same block address. Thus, there is a one-to-one correspondence, or a "mapping", between each source image, specified as a sequential frame number, and a block address on the RAID.

The second set of digital images, which are generated at step 266, represents the visual elements with surface imagery as seen from the desired point of view, which desired point of view moves at a desired velocity. The desired point of view and desired velocity represent the point of view of the driver as the simulator system 10 simulates his motion around the race track. By selecting appropriate images from the image database 218 and presenting these selected images to the user, a video retrieval engine 220 (FIG. 8) simulates the view seen from the user's virtual car as it moves around the race track. The image generator generates the second set of images at a rate sufficient to provide the illusion of continuous, uninterrupted motion, i.e. at least twenty-four but preferably thirty images per second.

In generating the second set of digital images, the image generator projects each texture map derived from each source image from a point-of-view position to the surfaces (polygons) of the polygon model. This projecting process provides the visual elements with further realistic detail. In the preferred embodiment, the point-of-view position used for the projecting process is the current point-of-view of the driver. However, in another embodiments, there are a number of projections from different points of view for each source image. In such an embodiment, these projections are performed before actual game play, rather than "on the fly", thus saving computing time during game play.

Figure 9:
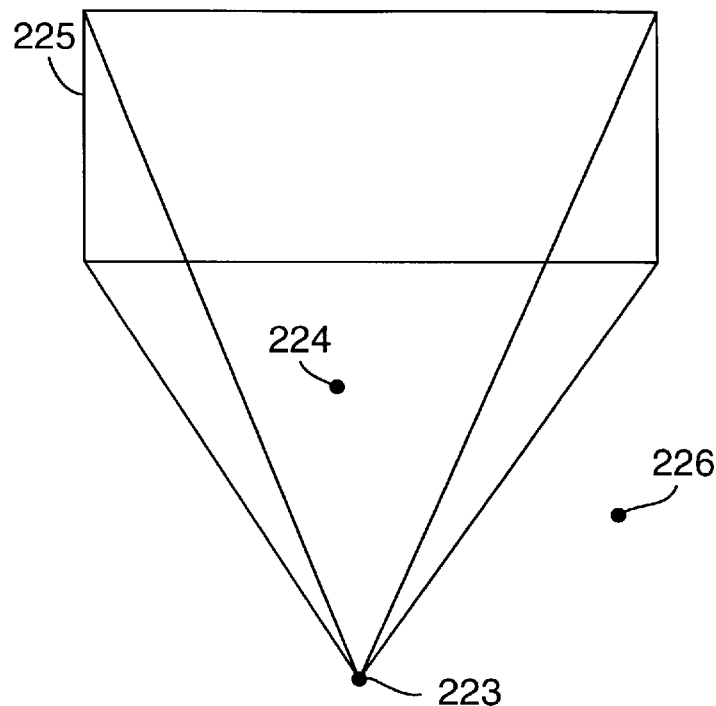
FIG. 9 is a schematic illustration of an image generator of the interactive race car simulator system of FIG. 1.

The desired point of view is constrained to a "view volume", which is the portion of the virtual world which is visible to the camera that recorded the source image. For example, as shown in FIG. 9, reference numeral 223 indicates the position of a camera, while the furthest points which are recorded by the camera lie on the rectangle indicated by reference numeral 225. Accordingly, the view volume is the pyramid defined by the rectangle 225 and the point 223. A point such as 224 lies within the view volume, while a point such as point 226 is outside of the view volume. Given this constraint, the entire portion of the track where the virtual car can drive must be in the view volume defined by at least one source image of the race track. Thus, the camera position can be moved arbitrarily within the total space defined by the union of the view volumes for all source images.

Presenting other, dynamic visual elements which are not part of the recorded images enhances the realism of the simulator system. Such dynamic visual elements preferably include other race cars on the race track which compete with the user and in general respond interactively to the actions of the user. Images of the dynamic visual elements must include images as seen from a number of distances, positions and viewing angles. Such images may be generated in accordance with carefully controlled camera images, or may be photorealistic, computer-generated graphics.

The other race cars can interact with the driver, for example by crashing into the driver's car. Implementing such interactions is well known in the game arts, and generally requires storing signals indicative of such information as a position of the driver's car and a position of the other race cars. When the distance between any two cars is below a prescribed minimum, a "collision" is indicated, and appropriate steps can be taken, such as generating crash sounds and changing the velocity of the colliding cars.

For each visual element, the image generator stores a number of digital images of the visual element as seen from various viewing angles, positions and distances. Each image of a visual element seen from a certain viewing angles, positions and distances is known as a "sprite", and the sprites are stored in a sprite database 219 (FIG. 8). By selecting the appropriate sprite from the sprite database, a sprite display engine 222 (FIG. 8) can display an image of a visual element overlaid on the image of the race track, as described hereinabove. Furthermore, by choosing the appropriate sequence of sprites to display, the visual element appears to be moving. The image generator thereby generates images of a race track and moving race cars as seen from the user's point of view as he drives.

The other race cars may be computer-controlled, thereby moving in accordance with any of a number of known driving algorithms, or may be controlled by other users in a networked, multi-user simulator environment. In such a networked, multi-user simulator environment, each of a plurality of simulator systems as described hereinabove are connected by a standard network connection, such as Ethernet. The information which must be shared between the simulator systems is minimal because each simulator system stores its own copy of storage-intensive information, such as images and polygon models of visual elements. Only information which differs for each user need be shared. Each user's simulator system can then display the appropriate sprites at the appropriate locations to represent the actions of the other users.

For example, in the preferred embodiment, each user provides only thirty-two bytes of information to other users on the network. For each user, six bytes are used to represent the user's position in the virtual world (two bytes each for x, y and z coordinates) and six bytes are used to represent the user's orientation (two bytes each for x, y and z coordinates of an orientation vector). Another two bytes are used to store a unique identifier for each user. The remaining eighteen bytes represent miscellaneous status information, such as whether the user's car is dented, whether the user is crashing, and whether the user's car is spinning. Of course, many other forms of status information about the users may be represented without departing from the scope of the present invention.

Because the amount of data which is shared is minimal (thirty-two bytes per user) and the data exchange rate is likewise minimal (thirty times per second per user), most currently available network communications protocols and hardware are more than adequate to support as many as ten networked users.

Figure 10:
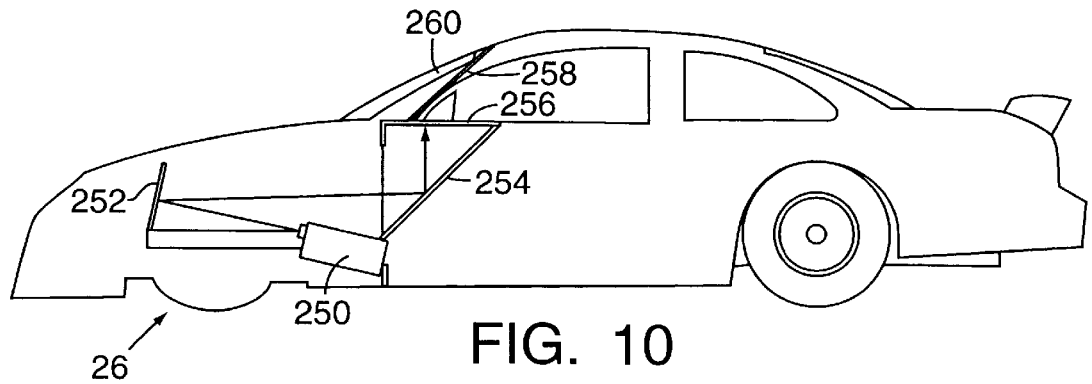
FIG. 10 is an image presentation apparatus of the system of FIG. 1 provided in accordance with the present invention.

Once the image generator generates signals indicative of images, the image presentation apparatus 26 (FIG. 1) presents the images to the user. FIG. 10 shows the preferred embodiment of such an image presentation apparatus, though such changes as in the dimensions, composition and location of components are anticipated by the present invention. As described hereinafter, the image presentation apparatus 26 comprises a projector which projects images and mirrors which redirect the projected images through a face plate of translucent plastic to a mirrored surface. The image presentation apparatus 26 thereby presents a large image within a limited "throw" distance by "folding" the image a number of times in limited space. The mirrored surface effectively projects the reflected image into virtual space, providing sufficient eye relief to comfortably view the images over an extended period of time.

A projector 250, located in the body of the car and pointing away from the user (not shown in FIG. 10) is preferably a conventional projector such as an XGE-1000 LCD projector sold by Sharp, Inc. The projector 250 can present images in dependence on either video or digital signals. A sturdy carrying frame (not shown) for securing the projector 250 includes a masking grill, neoprene shock cushioning, and a power strip for electrical connection to the projector. The frame allows the projector to be tilted to move the projected image into the proper angle of incidence with the mirrors described below.

The projected image is received from the projector 250 by a first front-surface mirror 252 which is 14 inches wide, 21 inches high and ¼ inch thick. The mirror 252 is constructed from float glass with a #756 aluminum coating and has 94% reflectivity. A second frame (not shown) holding the mirror 252 is mounted to a sturdy substrate such as aluminum-reinforced plywood. The second frame is supported by adjustable brackets which allow fine tuning of the mirror's reflection angle so that the projected image can be reflected toward a desired target position.

The mirror 252 reflects the projected image to a second front-surface mirror 254 which is 24 inches wide, 52.5 inches high and ¼ inch thick. The mirror is a standard household mirror having safety backing and arc-adhered to a third frame (not shown) of aluminum-reinforced plywood. The mirror 254 is larger than the mirror 252 because the mirror 254 must accept the increased size of the projected image.

The mirror 254 redirects the enlarged, projected image through a white, translucent polystyrene sheet 256. The sheet 256 is ⅛ inch thick and is supported by a fourth frame (not shown) which clamps the sheet's edges. The fourth frame is a part of the structure of the dashboard of the driver module. The size of the sheet is equal to the final size of the image, as described below.

The mirror 254 redirects the enlarged, projected image through the sheet 256 and onto a third mirror 258. The third mirror 258 is a 24 inches wide, 52.5 inches high and ¼ inch thick standard household mirror having safety backing and arc-adhered to a fifth frame (not shown) of aluminum-reinforced plywood. The mirror is located in the area corresponding to a windshield in a car, facing a direction 45 degrees from horizontal.

The third mirror 258 is the final viewing surface. The image projected onto the third mirror 258 and seen by the user accurately simulates the original perspective environment of the image. The user perceives the viewed image as not on the surface of the third mirror 258 but as beyond the surface of the mirror 258 because the viewed image exhibits depth of field and perspective to the horizon. Furthermore, because the user is in very close proximity to the large scale image on the third mirror 258, the user's sense of immersion in the image is great without the eye strain that results from conventional image presentation systems.

An outer windshield mask 260 is an opaque decorative shield located on the outside of the windshield. The mask 260, preferably a back-painted polycarbonate sheet, blocks light from outside the car and conceals the third mirror 258 from being seen outside the car.

In another embodiment of the image presentation apparatus 26, the projector 250, the mirrors 252 and 254, and the sheet 256 are replaced with a single flat-screen cathode ray tube (CRT) monitor or digital liquid panel (DLP) display placed at 45 degrees to the third mirror 258. Since this embodiment eliminates multiple reflections of the projected image and provides a direct light source onto the mirror 258, the resulting quality of the image is significantly improved. Also, instead of three mirrors, two mirrors may similarly be used in the present invention. Furthermore, the above-described mirrors 252, 254, 258 may be rear-surface mirrors rather than front-surface mirrors.

It will be understood by those skilled in the art that the image generator 14, the game controller 12, the motion base controller 22 and the sound generator 16 are preferably computer-based control apparatus, and may be implemented either on a single computing platform or distributed across a plurality of computer platforms. In the preferred embodiment, all computing platform functions are performed by a conventional 166 MHz Intel 586-based computer having 256 MBytes of RAM and a 4.3 GByte hard drive, a sound card and a high speed internal hard drive. The 586-based computer is furthermore connected to standard input and output interface devices, such as D/A and A/D converters for communicating with such devices as the motion base, the projector, the steering wheel and the pedals.

Although the invention has been shown and described with respect to a preferred embodiment thereof, it would be understood by those skilled in the art that other various changes, omissions and additions thereto may be made without departing from the spirit and scope of the present invention. For example, instead of the above-described input devices, output devices and image presentation apparatus, either head-mounted displays or full-surround displays with Virtual Reality (VR) manipulators, such as data gloves, may be used. In addition, several other types of vehicle simulators, such as aircraft, submarine, boat and space ships simulators, may be implemented without significant modifications to the embodiment presented herein.

What is claimed is:

1. An interactive, vehicle simulator system for receiving input signals indicative of actions of a user located in a driver module, and for displaying images and moving the driver module in accordance with the input signals, the interactive, vehicle simulator system comprising:

an input device for generating the input signals;

an image generator for receiving signals indicative of a first set of processed, pre-recorded digital images, and for generating signals indicative of a second set of digital images, which second set of digital images is indicative of a select number of the first set of processed, pre-recorded digital images as seen from a desired point-of-view position which has a desired velocity;

an image presentation apparatus for receiving the signals indicative of the second set of digital images and for generating in dependence thereupon the second set of digital images, and for presenting the second set of digital images to the user;

a motion base connected to the driver module for moving the driver module along an axis in accordance with motion base control signals;

a motion base controller which is in signal communication with the motion base for generating the motion base control signals; and a game controller in signal communication with the input device, the motion base controller and the image generator, the game controller for generating signals for controlling the image generator and the motion base controller in accordance with the input signals.

2. The interactive, vehicle simulator system of claim 1, wherein the image presentation apparatus comprises:

image projection means for generating the second set of digital images; and a mirror for receiving the second set of digital images and for reflecting the second set of digital images towards the user.

3. The simulator system of claim 1, wherein the image generator stores a number of sprite images of a visual element as seen from various viewing angles, positions and distances, and generates signals indicative of a selected sequence of the sprite images in dependence on the desired viewpoint and the desired velocity.

4. The simulator system of claim 1, in which the simulator system is connected over a communication network to and cooperates substantially contemporaneously with a second simulator system for providing a visual element which responds in accordance with the actions of a second user.

5. The simulator system of claim 1, wherein the image generator further comprises:

a means for rotoscoping each of the first set of pre-recorded digital images in order to determine a position and an orientation of a camera that recorded the digital image.

6. The simulator system of claim 1, wherein the image generator further comprises:

a means for generating a texture map from each of the first set of pre-recorded digital images.

7. The simulator system of claim 6, wherein the image generator further comprises:

projecting each texture map from a point-of-view position onto surface polygons of a visual element.

8. The simulator system of claim 6, wherein the image generator further comprises:

projecting each texture map from a plurality of point-of-view positions onto surface polygons of a visual element.

* * * * *